(12) United States Patent
Liu et al.

(10) Patent No.: US 12,279,163 B2
(45) Date of Patent: Apr. 15, 2025

(54) REGISTRATION WITH ACCESSIBILITY AND MOBILITY MANAGEMENT FUNCTION RE-ALLOCATION

(71) Applicant: ZTE CORPORATION, Guangdong (CN)

(72) Inventors: Yuze Liu, Shenzhen (CN); Shilin You, Shenzhen (CN); Jin Peng, Shenzhen (CN); Wantao Yu, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 409 days.

(21) Appl. No.: 17/891,791

(22) Filed: Aug. 19, 2022

(65) Prior Publication Data

US 2022/0394566 A1    Dec. 8, 2022

Related U.S. Application Data

(63) Continuation of application No. PCT/CN2020/076715, filed on Feb. 26, 2020.

(51) Int. Cl.
*H04W 60/00* (2009.01)
*H04W 8/26* (2009.01)
*H04W 36/00* (2009.01)

(52) U.S. Cl.
CPC ......... *H04W 36/0033* (2013.01); *H04W 8/26* (2013.01)

(58) Field of Classification Search
None
See application file for complete search history.

(56) References Cited

U.S. PATENT DOCUMENTS

| | | |
|---|---|---|
| 2018/0317163 A1 | 11/2018 | Lee et al. |
| 2019/0174449 A1 | 6/2019 | Shan et al. |
| 2019/0230556 A1 | 7/2019 | Lee |
| 2019/0261260 A1 | 8/2019 | Dao et al. |
| 2019/0261453 A1 | 8/2019 | Jain et al. |
| 2020/0053828 A1 | 2/2020 | Bharatia et al. |

FOREIGN PATENT DOCUMENTS

| | | |
|---|---|---|
| CN | 109257815 A | 1/2019 |
| CN | 109673031 A | 4/2019 |
| CN | 110769420 A | 2/2020 |
| WO | WO-2019/075623 A1 | 4/2019 |

(Continued)

OTHER PUBLICATIONS

3rd Generation Partnership Project; Technical Specification Group Services and System Aspects; Procedures for the 5G System (5GS); Stage 2 (Release 15), 3GPP TS 23.502 V15.8.0 (Dec. 2019), 360 pages.

(Continued)

*Primary Examiner* — Gary Lafontant
(74) *Attorney, Agent, or Firm* — Foley & Lardner LLP

(57) ABSTRACT

Presented are systems and methods for acquiring channel state information. A wireless communicate node may transmit a channel state information reference signal (CSI-RS) to a wireless communication device via a first antenna port of a plurality of antenna ports of the wireless communication node. The wireless communication node may receive a channel state information (CSI) report from the wireless communication device.

20 Claims, 6 Drawing Sheets

(56) References Cited

FOREIGN PATENT DOCUMENTS

| WO | WO-2019/169612 A1 | 9/2019 | |
| WO | WO-2020085964 A1 * | 4/2020 | ........ H04W 52/0212 |

OTHER PUBLICATIONS

Ericsson, "AMF reallocation", 3GPP TSG-SA WG2 Meeting #136, S2-1911105, Oct. 18, 2019, Reno, Nevada, US (3 pages).

First Office Action for CN Appl. No. 202080085345.5, dated Jul. 16, 2024 (with English translation, 8 pages).

3rd Generation Partnership Project; Technical Specification Group Services and System Aspects; Procedures for the 5G System (5GS); Stage 2 (Release 16), 3GPP TS 23.502 V16.3.0 (Dec. 2019), 558 pages.

Office Action for KR Appl. No. 10-2022-7029715, dated Jul. 22, 2024 (with English translation, 8 pages).

3GPP, "Technical Specification Group Services and System Aspects", 3GPP TS 23.502, V15.8.0, Dec. 2019 (357 pages).

Ericsson, "Amf reallocation and slicing", 3GPP TSG-SA3 Meeting #98e, S3-200372, Mar. 6, 2020, e-Meeting (3 pages).

Ericsson, "AMF reallocation", 3GPP TSG-SA WG2 Meeting #136, S2-1911106, Oct. 14, 2019, Reno, Nevada, US (8 pages).

Extended European Search Report for EP Appl. No. 208899890.8, dated Feb. 21, 2023 (12 pages).

Huawei et al., "Discussion on AMF reallocation", 3GPP TSG-SA WG3 Meeting #98e, S3-200206, Mar. 6, 2020, e-Meeting (4 pages).

International Search Report and Written Opinion for PCT Appl. No. PCT/CN2020/076715 mailed Nov. 30, 2020 (8 pages).

ZTE: "Updates to CreateUEContext for eNS Support" 3GPP TSG-CT WG4 Meeting #90, C4-191144; Mar. 29, 2019(Mar. 29, 2019)Xi'an, P.R. China (7 pages).

NTT Docomo, et al., "Slice interworking HR mode update," 3GPP TTS-SA WG2 Meeting #131; S2-1901651 (revision of S2-181xxx); Change Request 23.502 CR 1037 rev, 15.4.0; Tenerife, Spain; Feb. 25-Mar. 1, 2019.

Second Office Action and Search Report for CN App. No. 202080085345.5 dated Dec. 17, 2024 (received Dec. 23, 2024; with partial English translation, 6 pages).

* cited by examiner

REGISTRATION WITH ACCESSIBILITY AND MOBILITY MANAGEMENT FUNCTION RE-ALLOCATION

CROSS-REFERENCE TO RELATED APPLICATION

This application claims the benefit of priority under 35 U.S.C. § 120 as a continuation of PCT Patent Application No. PCT/CN2020/076715, filed on Feb. 26, 2020, the disclosure of which is incorporated herein by reference in its entirety.

TECHNICAL FIELD

The disclosure relates generally to wireless communications, including but not limited to systems and methods for registering with accessibility and mobility management function (AMF) re-allocation based on a network slice selection function (NSSF).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A network slice selection function (NSSF) may receive a first message comprising a user equipment (UE) context from an initial access and mobility management function (AMF). The NSSF may generate a UE context identifier. The NSSF may associate the UE context identifier with the UE context. The NSSF may transmit, to a target AMF, a second message comprising the UE context.

In some embodiments, the NSSF may initiate a procedure to request the initial AMF for the UE context. In some embodiments, the NSSF may send, to the initial AMF, a UE context request message that includes the UE context identifier and an identifier of the NSSF. In some embodiments, the NSSF may receive, in response to the UE context request message, the first message comprising the UE context from the initial AMF.

In some embodiments, the initial AMF may transmit a non-access stratum (NAS) message to a radio access network (RAN). The NAS message may include the identifier of the NSSF, and the UE context identifier or a subscription permanent identifier (SUPI). In some embodiments, the RAN may transmit an initial UE message to the target AMF. The initial UE message may include the identifier of the NSSF, and the UE context identifier or the SUPI.

In some embodiments, the NSSF may receive, from the target AMF, a request message that includes the UE context identifier or the SUPI. The request message may be directed to the NSSF according to the identifier of the NSSF. In some embodiments, the NSSF may identify, according to the UE context identifier or the SUPI, the UE context to transmit to the target AMF. In some embodiments, the NSSF may transmit, to the target AMF in response to the request message, the second message comprising the UE context.

In some embodiments, the NSSF receives the first message via a procedure initiated by the initial AMF. In some embodiments, the NSSF may send, to the initial AMF, a response message that includes the UE context identifier and an identifier of the NSSF. In some embodiments, the initial AMF may transmit a non-access stratum (NAS) message to a radio access network (RAN). The NAS message may include the identifier of the NSSF, and the UE context identifier or a subscription permanent identifier (SUPI).

In some embodiments, the RAN may transmit an initial UE message to the target AMF. The initial UE message may include the identifier of the NSSF, and the UE context identifier or the SUPI. In some embodiments, the NSSF may receive, from the target AMF, a request message that includes the UE context identifier or the SUPI. The request message may be directed to the NSSF according to the identifier of the NSSF. In some embodiments, the NSSF may identify, according to the UE context identifier or the SUPI, the UE context to transmit to the target AMF. In some embodiments, the NSSF may transmit, to the target AMF in response to the request message, the second message comprising the UE context.

At least one aspect is directed to a system, method, apparatus, or a computer-readable medium. An initial access and mobility management function (AMF) may transmit, to a network slice selection function (NSSF), a first message comprising a user equipment (UE) context. The AMF may cause the NSSF to transmit a second message comprising the UE context to a target AMF. The UE context may be associated with a UE context identifier generated by the NSSF.

In some embodiments, the AMF may cause the NSSF to initiate a procedure to request the initial AMF for the UE context. In some embodiments, the initial AMF may receive, from the NSSF, a UE context request message that includes the UE context identifier and an identifier of the NSSF. In some embodiments, the initial AMF may send, from the NSSR in response to the UE context request message, the first message comprising the UE context from the initial AMF.

In some embodiments, the initial AMF may transmit a non-access stratum (NAS) message to a radio access network (RAN). The NAS message may include the identifier of the NSSF, and the UE context identifier or a subscription permanent identifier (SUPI). In some embodiments, the RAN may transmit an initial UE message to the target AMF, the initial UE message including the identifier of the NSSF, and the UE context identifier or the SUPI.

In some embodiments, the initial AMF may cause the NSSF to receive, from the target AMF, a request message that includes the UE context identifier or the SUPI. The request message may be directed to the NSSF according to the identifier of the NSSF. In some embodiments, the initial AMF may cause the NSSF to identify, according to the UE context identifier or the SUPI, the UE context to transmit to the target AMF. In some embodiments, the initial AMF may cause transmit, to the target AMF in response to the request message, the second message comprising the UE context.

In some embodiments, the NSSF may receive the first message via a procedure initiated by the initial AMF. In some embodiments, the initial AMF may receive, from the NSSF, a UE context transfer message that includes the UE context identifier and an identifier of the NSSF. In some embodiments, the initial AMF may send, in response to the UE context transfer message, the first message comprising the UE context to the NSSF.

In some embodiments, the initial AMF may transmit a non-access stratum (NAS) message to a radio access network (RAN). The NAS message may include the identifier of the NSSF, and the UE context identifier or a subscription permanent identifier (SUPI). In some embodiments, the RAN may send an initial UE message to the target AMF. The initial UE message may include the identifier of the NSSF, and the UE context identifier or the SUPI.

In some embodiments, the initial AMF may cause the NSSF to receive from the target AMF, a request message that includes the UE context identifier or the SUPI. The request message may be directed to the NSSF according to the identifier of the NSSF. In some embodiments, the initial AMF may cause the NSSF to identify, according to the UE context identifier or the SUPI, the UE context to transmit to the target AMF. In some embodiments, the initial AMF may cause the NSSF to transmit, to the target AMF in response to the request message, the second message comprising the UE context.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
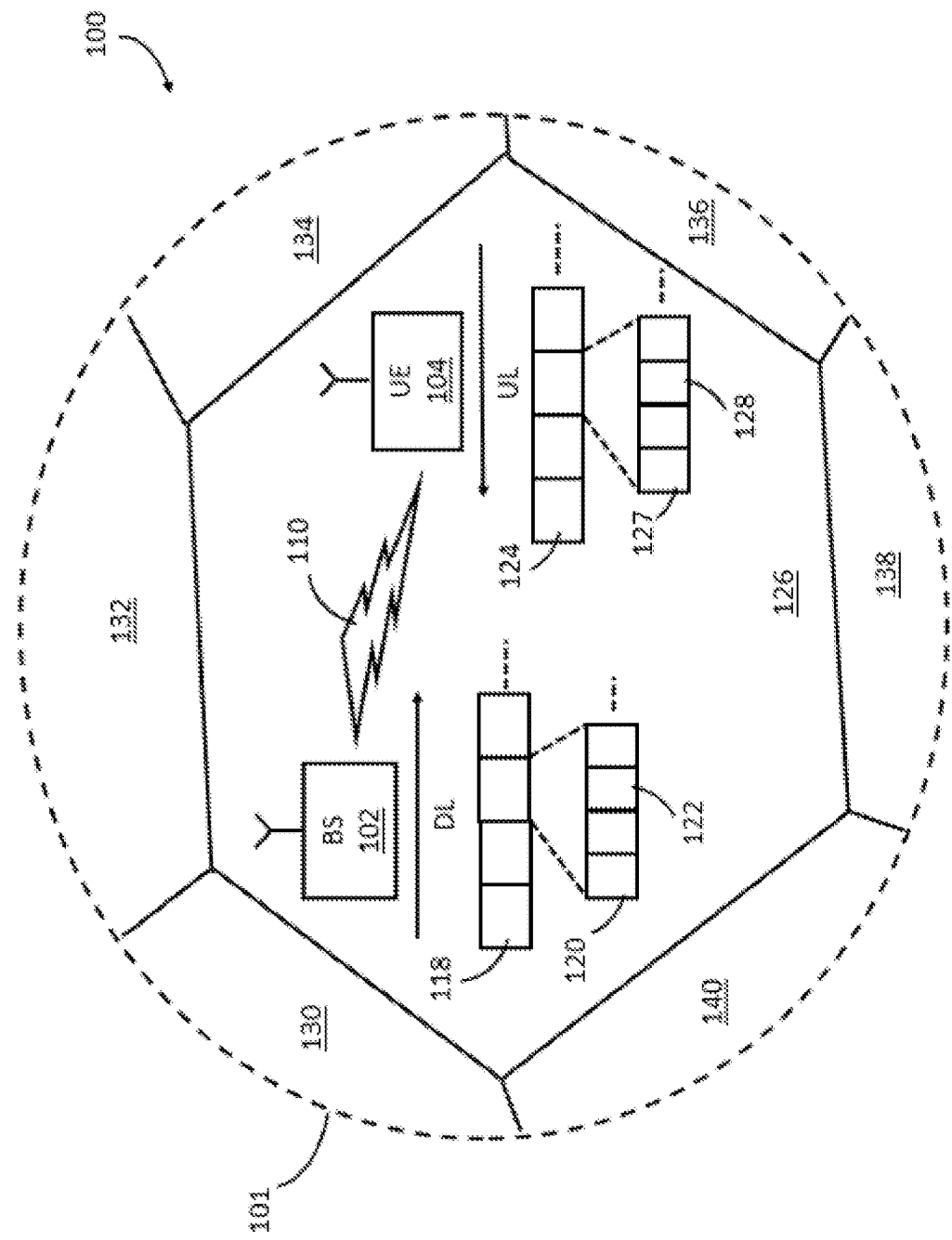
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| AF | Application Function |
| AMF | Access and Mobility Management Function |
| AN | Access Network |
| ARP | Allocation and Retention Priority |
| AUSF | Authentication Service Function |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| GUAMI | Globally Unique AMF Identifier |
| GUTI- | Globally Unique Temporary UE Identifier |
| HARQ | Hybrid Automatic Repeat Request |
| HPLMN | Home Public Land Mobile Network |
| LADN | Local Area Data Network |
| MAC | Medium Access Control |
| MAC-CE | Medium Access Control (MAC) Control Element (CE) |

-continued

| Acronym | Full Name |
|---|---|
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| S-NSSAI | Single-Network Slice Selection Assistance Information |
| NSSF | Network Slice Selection Function |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PLMN | Public Land Mobile Network |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RB | Resource Block |
| RBG | Resource Block Group |
| RE | Resource Element |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SUCI | Subscription Concealed Identifier |
| SUPI | Subscription Permanent Identifier |
| SSB | SS/PBCH Block |
| TB | Transport Block |
| TC | Transmission Configuration |
| TCI | Transmission Configuration Indicator |
| TIUC | NSSF assigned Temporary Identity for UE Context (TIUC) |
| TMSI | Temporary Mobile Subscriber Identity |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
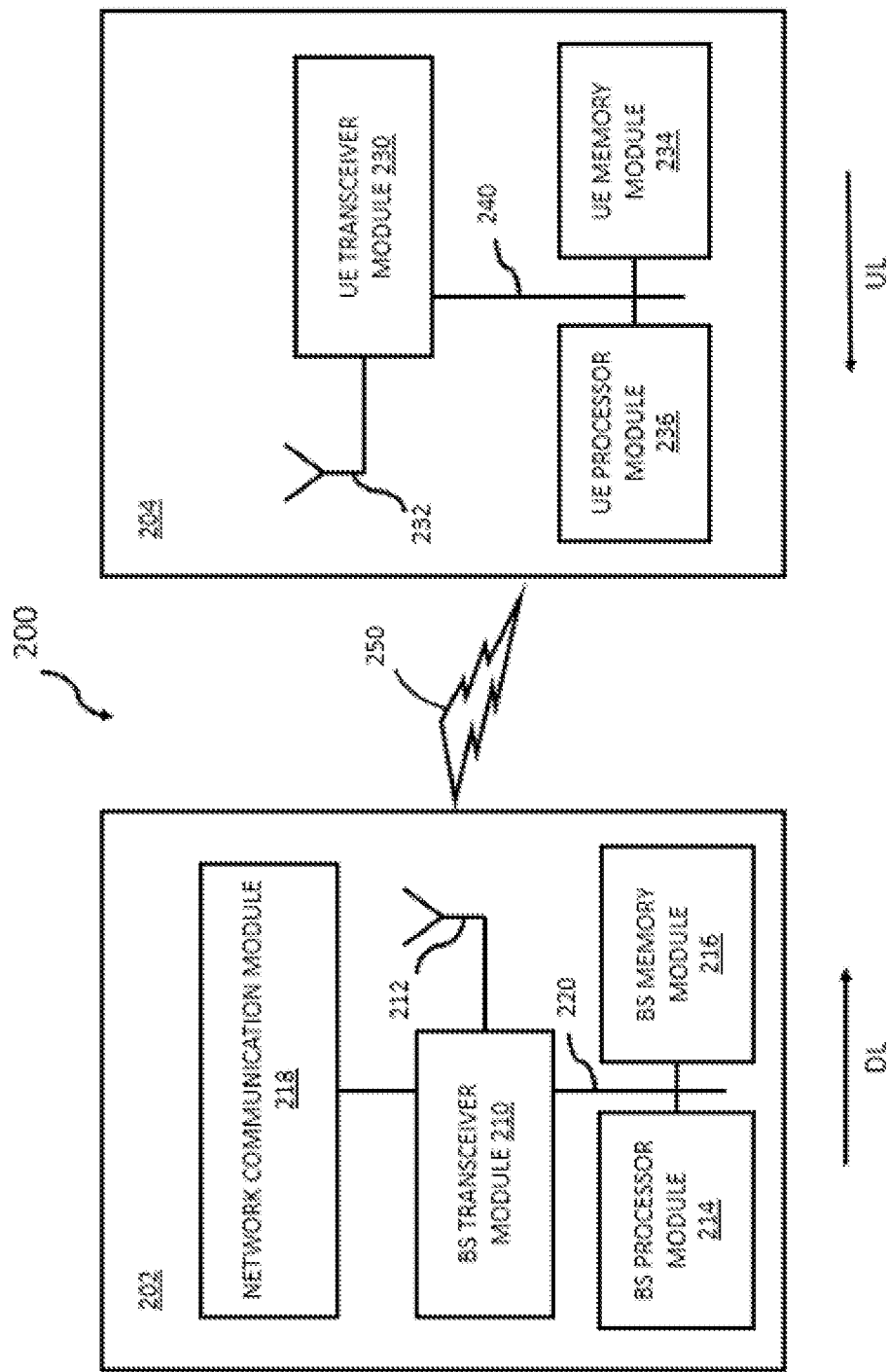
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Registering with Accessibility and Mobility Management (AMF) Function Re-Allocation Based on a Network Slice Selection Function (NSSF)

The registration procedure with AMF reallocation may be performed in accordance with a definition (e.g., clause 4.2.2.2.2 and 4.2.2.2.3 in 23.502). The procedure may have security flaws, which can lead to registration failure of UEs. For example, during the idle mobility registration procedure with AMF reallocation, the registration can fail when: (1) the initial AMF and the UE has established new NAS security context different from the old NAS security context, which was established between the old AMF and the UE and (2) the Target AMF has fetched the old NAS security context of the UE from the old AMF and the Target AMF has decided to use it. In this case, the NAS security context, including the $K_{AMF}$ used by the UE, may be different from that used by the Target AMF. This may cause the integrity check of the NAS message to fail, and consequently cause registration failure.

Figure 3:
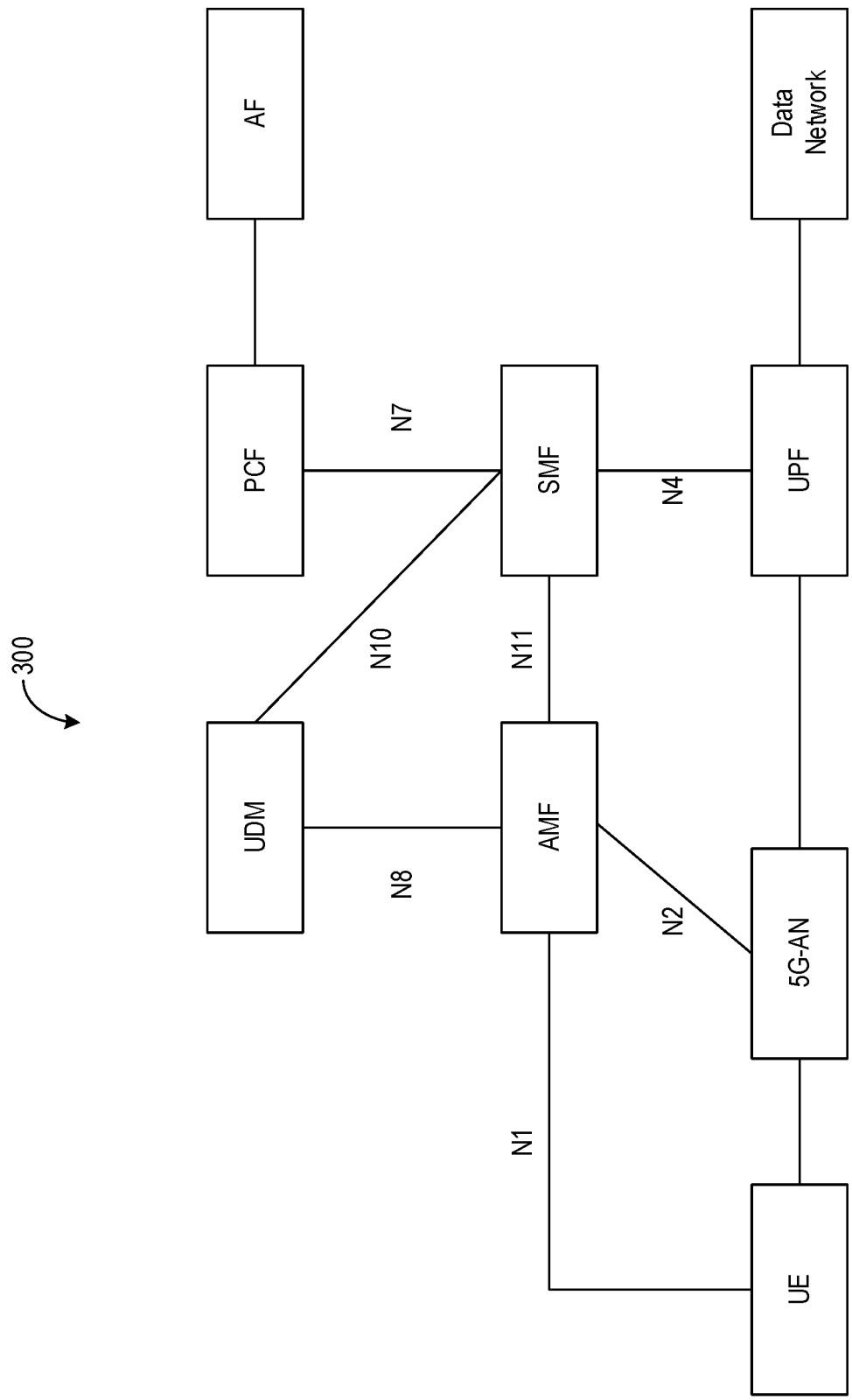
FIG. 3 illustrates a block diagram of an architecture of 5GS.

Referring now to FIG. 3, depicted is a block diagram of a system 300 of an architecture of 5GS. The 5G System architecture may include the following network functions (NF):

The Access and Mobility Management function (AMF) includes functionalities. such as: UE mobility management, reachability management, and connection management, among others. The AMF may terminate the radio access network (RAN) control plane (CP) interface (N2) and NAS(N1), NAS ciphering and integrity protection. The AMF may also distribute the SM NAS to the proper SMFs via an N11 interface;

The Session Management function (SMF) may include: UE IP address allocation & management, selection and control of UP function, and protocol data unit (PDU) connection management, among others;

The User plane function (UPF) is the anchor point for Intra-/Inter-RAT mobility and the external PDU session point of interconnect to Data Network. UPF may also route and forward the data packet as the indication from the SMF. UPF may also buffer the downlink (DL) data when the UE is in idle mode.

The Unified Data Management (UDM) may store the subscription profile for the UEs.

The Policy Control Function (PCF) may generate the policy to govern network behaviour based on the subscription and indication from AF. The PCF may also provide policy rules to CP functions (e.g., AMF and SMF) to enforce them.

When UE sends a registration request to initial AMF, the UE and the initial AMF can establish a security association. The current procedure may be re-used and the NSSF may store and provide the UE context to a target AMF.

Figure 4:
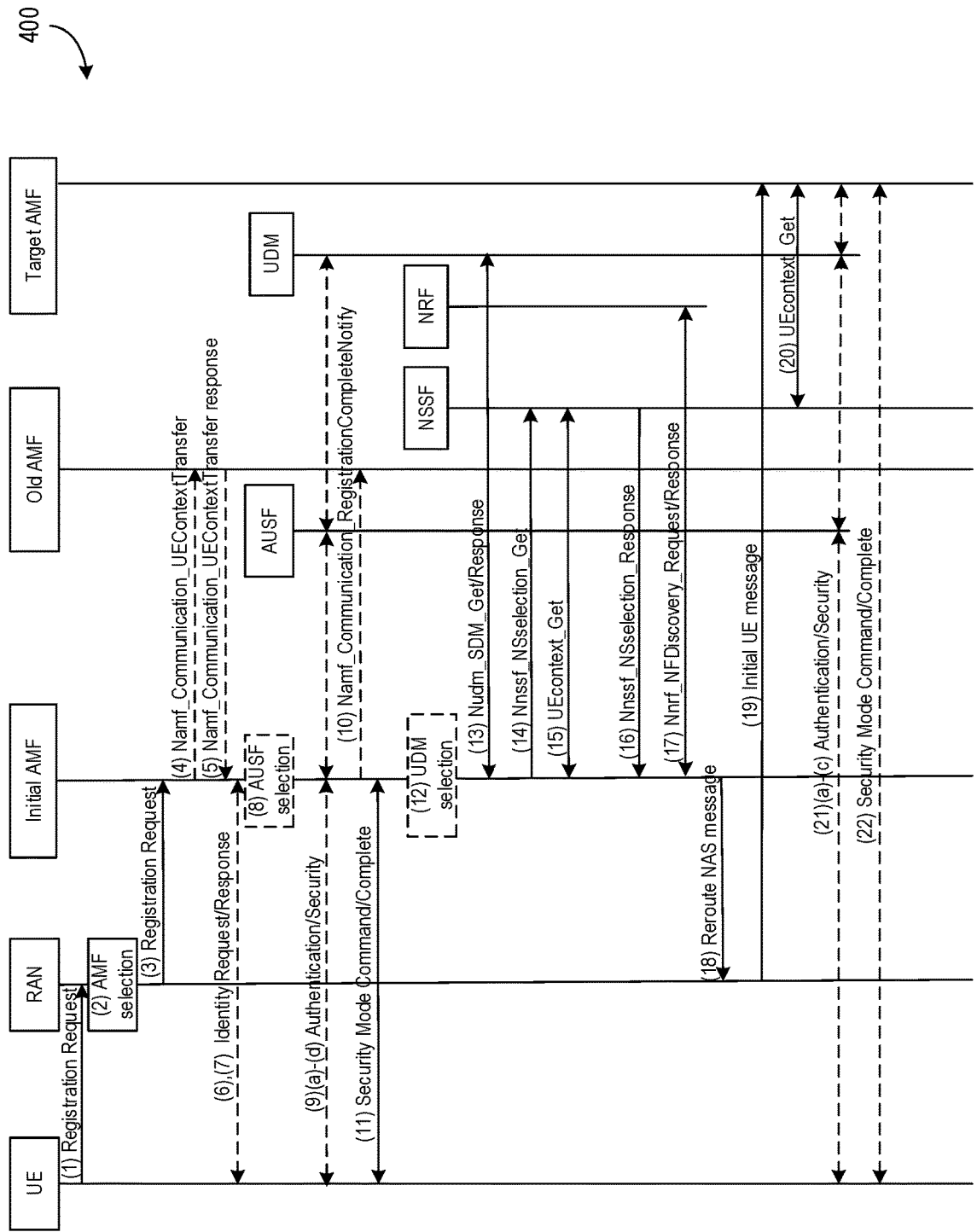
FIG. 4 illustrates a dataflow diagram of an example method of registering with accessibility and mobility management (AMF) function re-allocation initiated by a network slice selection function (NSSF)

Case 1: NSSF Determines to Initiate AMF Re-Allocation Procedure and Request the UE Context from an Initial AMF Referring now to FIG. 4, depicted is a dataflow diagram of a method 400 of registering with accessibility and mobility management (AMF) function re-allocation initiated by a network slice selection function (NSSF). The method 400 may involve the NSSF deciding or determining to initiate an AMF re-allocation procedure, and requesting the UE context from an initial AMF. At step (1), UE may send AN message to the (R)AN. The AN message may include: AN parameters, Registration Request (Registration type, subscription concealed identifier (SUCI) or 5G globally unique temporary identity (5G-GUTI) or permanent equipment identifier (PEI), last visited TAI (if available), Security parameters, Requested network slice selection assistance information (NSSAI), [Mapping Of Requested NSSAI], Default Configured NSSAI Indication, UE Radio Capability Update, UE MM Core Network Capability, PDU Session status, List Of PDU Sessions To Be Activated, Follow-on request, mobile initiated connection only (MICO) mode preference, Requested discontinuous reception (DRX) parameters, [LADN DNN(s) or Indicator Of Requesting LADN Information], [NAS message container]) and UE Policy Container (the list of PSIs, indication of UE support for ANDSP and the operating system identifier), among others. The UE Policy Container and its usage may be defined, for example, in 3GPP TS 23.503.

In the case of NG-RAN, the AN parameters may include for example, a 5G-S-temporary mobile subscriber identity (TMSI) or globally unique AMF identifier (GUAMI), the Selected public land mobile network (PLMN) ID and Requested NSSAI. The AN parameters can also include an Establishment cause. The Establishment cause provides a reason for requesting the establishment of an RRC connection. Whether and how the UE includes the Requested NSSAI as part of the AN parameters may be dependent on a value of the Access Stratum Connection Establishment NSSAI Inclusion Mode parameter, as specified in clause 5.15.9 of 3GPP TS 23.501.

The Registration type indicates that if the UE wants to perform an Initial Registration (i.e., the UE is in RM-DEREGISTERED state), a Mobility Registration Update (e.g., the UE is in RM-REGISTERED state and initiates a Registration procedure due to mobility or due to the UE having to update its capabilities or protocol parameters, or to request a change of the set of network slices it is allowed to use), a Periodic Registration Update (e.g., the UE is in a RM-REGISTERED state and initiates a Registration procedure due to the Periodic Registration Update timer expiry, see clause 4.2.2.2.1 of 3GPP TS 23.502) or an Emergency Registration (i.e., the UE is in limited service state).

When the UE is performing an Initial Registration, the UE shall indicate its UE identity in the Registration Request message as follows:
  a native 5G-GUTI assigned by a PLMN to which the UE is attempting to register, if available;
  a native 5G-GUTI assigned by an equivalent PLMN to the PLMN to which the UE is attempting to register, if available;
  a native 5G-GUTI assigned by any other PLMN, if available.

This can also be a 5G-GUTI assigned via another access type. Otherwise, the UE may include its SUCI in the Registration Request as defined in TS 33.501

The NAS message container shall be included if the UE is sending a Registration Request message as an Initial NAS message, and the UE has a valid 5G NAS security context, and the UE is to send non-cleartext IEs, see clause 4.4.6 in 3GPP TS 24.501. If the UE does not need to send non-cleartext IEs, the UE is to send a Registration Request message without including the NAS message container.

If the UE does not have a valid 5G NAS security context, the UE shall send the Registration Request message without including the NAS message container. The UE shall include the entire Registration Request message (i.e., containing cleartext IEs and non-cleartext IEs) in the NAS message container that is sent as part of the Security Mode Complete message in step (9)(b) detailed herein below.

When the UE is performing an Initial Registration (i.e., the UE is in RM-DEREGISTERED state) with a native 5G-GUTI, then the UE shall indicate the related GUAMI information in the AN parameters. When the UE is performing an Initial Registration with its SUCI, the UE shall not indicate any GUAMI information in the AN parameters.

For an Emergency Registration, the SUCI may be included if the UE does not have a valid 5G-GUTI available. The PEI may be included when the UE has no SUPI and no valid 5G-GUTI. In other cases, the 5G-GUTI can be included and it indicates the last serving AMF.

The UE may provide the UE's usage setting based on its configuration (e.g., as defined in 3GPP TS 23.501 clause 5.16.3.7). The UE provides Requested NSSAI (e.g., as described in 3GPP TS 23.501 clause 5.15.5.2.1), and in the case of Initial Registration or Mobility Registration Update, the UE includes the Mapping Of Requested NSSAI (if available), which is the mapping of each S-NSSAI of the Requested NSSAI to the HPLMN S-NSSAIs, to ensure that the network is able to verify whether the S-NSSAI(s) in the Requested NSSAI are permitted based on the Subscribed S-NSSAIs. The UE includes the Default Configured NSSAI Indication if the UE is using a Default Configured NSSAI (e.g., as defined in 3GPP TS 23.501).

In the case of Mobility Registration Update, the UE may include in the list of PDU sessions to be activated, the PDU sessions for which there are pending uplink data. When the UE includes the list of PDU Sessions to be activated, the UE shall indicate PDU Sessions only associated with the access the Registration Request is related to. The UE shall include always-on PDU Sessions (e.g., as defined in 3GPP TS 24.501) which are accepted by the network in the List of PDU sessions to be activated, even if there are no pending uplink data for those PDU sessions. A PDU session corresponding to a LADN may not be included in the list of PDU sessions to be activated, when the UE is outside the area of availability of the LADN.

The UE MM Core Network Capability is provided by the UE and handled by AMF (e.g., as defined in TS 23.501 clause 5.4.4a). The UE includes in the UE MM Core Network Capability an indication if it supports Request Type flag "handover" for PDN connectivity request during the attach procedure (e.g., as defined in clause 5.17.2.3.1 of 3GPP TS 23.501). The UE may provide either the LADN DNN(s) or an Indication of Requesting LADN Information (e.g., as described in 3GPP TS 23.501 clause 5.6.5). If available, the last visited TAI shall be included in order to help the AMF produce a Registration Area for the UE.

Security parameters are used for Authentication and integrity protection (e.g., as defined in TS 33.501). The requested NSSAI indicates the Network Slice Selection Assistance Information (e.g., as defined in clause 5.15 of 3GPP TS 23.501). The PDU Session status indicates the previously established PDU Sessions in the UE. When the UE is connected to the two AMFs belonging to different PLMN via 3GPP access and non-3GPP access, then the PDU Session status indicates the established PDU Session of the current PLMN in the UE.

A follow-on request is included when the UE has pending uplink signaling and the UE does not include a list of PDU sessions to be activated, or the Registration type indicates the UE wants to perform an Emergency Registration. In an Initial Registration and Mobility Registration Update, the UE provides the UE Requested DRX parameters (e.g., as defined in clause 5.4.5 of 3GPP TS 23.501). The UE may provide an UE Radio Capability Update indication (e.g., as described in 3GPP TS 23.501).

At step (2) of method 400, if a 5G-S-TMSI or GUAMI is not included. or the 5G-S-TMSI or GUAMI does not indicate a valid AMF, the (R)AN, based on (R)AT and Requested NSSAI, if available, selects an AMF. The (R)AN selects an AMF as described in 3GPP TS 23.501, clause 6.3.5. If UE is in CM-CONNECTED state, the (R)AN can forward the Registration Request message to the AMF based on the N2 connection of the UE. If the (R)AN cannot select an appropriate AMF, it forwards the Registration Request to an AMF which has been configured, in (R)AN, to perform AMF selection.

At step (3) of method 400, the (R)AN provides or sends to the initial AMF: N2 message (N2 parameters, Registration Request (as described in step (1)) and UE Policy Container. When NG-RAN is used, the N2 parameters may include the Selected PLMN ID, Location Information and Cell Identity related to the cell in which the UE is camping, UE Context Request which indicates that a UE context including security information is to be setup at the NG-RAN. When NG-RAN is used, the N2 parameters can also include the Establishment cause. Mapping Of Requested NSSAI is provided when available. When the Establishment cause is associated with priority services (e.g., MPS, MCS), the AMF includes a Message Priority header to indicate priority information. Other NFs can relay the priority information by including the Message Priority header in service-based interfaces (e.g., as specified in 3GPP TS 29.500).

At step (4), the initial AMF may send to the old AMF: Namf_Communication_UEContextTransfer (complete Registration Request) or initial AMF to UDSF: Nudsf_Unstructured Data Management_Query( ). With UDSF Deployment, if the UE's 5G-GUTI was included in the Registration Request and the serving AMF has changed since last Registration procedure, initial AMF and old AMF are in the same AMF Set and UDSF is deployed, the initial AMF retrieves the stored UE's SUPI and UE context directly from the UDSF using Nudsf_UnstructuredDataManagement-_Query service operation, or they can share stored UE context via implementation specific means if UDSF is not deployed. This includes also event subscription information by each NF consumer for the given UE. In this case, the initial AMF uses integrity protected complete Registration request NAS message to perform and verify integrity protection.

Without UDSF Deployment, if the UE's 5G-GUTI was included in the Registration Request and the serving AMF has changed since last Registration procedure, the initial AMF may invoke the Namf_Communication_UEContext-Transfer service operation on the old AMF including the complete Registration Request NAS message, which may be integrity protected, as well as the Access Type, to request the UE's SUPI and UE Context (e.g., as laid out in clause 5.2.2.2.2 of 3GPP TS 23.502). In this case, the old AMF uses either 5G-GUTI and the integrity protected complete Registration request NAS message, or the SUPI and an indication that the UE is validated from the initial AMF, to verify integrity protection if the context transfer service operation invocation corresponds to the UE requested. The old AMF also transfers the event subscriptions information by each NF consumer, for the UE, to the initial AMF.

Without UDSF deployment, if the UE's 5G-GUTI was included in the Registration Request and the serving AMF has changed since last Registration procedure, the initial AMF may invoke the Namf_Communication_UEContext-Transfer service operation on the old AMF including the complete Registration Request NAS message, which may be integrity protected, as well as the Access Type, to request the UE's SUPI and UE Context (e.g., as laid out in clause 5.2.2.2.2 of 3GPP TS 23.502). In this case, the old AMF uses either 5G-GUTI and the integrity protected complete Registration request NAS message, or the SUPI and an indication that the UE is validated from the initial AMF, to verify integrity protection if the context transfer service operation invocation corresponds to the UE requested. The old AMF can also transfer the event subscriptions information by each NF consumer, for the UE, to the initial AMF.

If the old AMF has PDU Sessions for another access type (different from the Access Type indicated in this step) and if the old AMF determines that there is no possibility for relocating the N2 interface to the initial AMF, the old AMF may return UE's SUPI and indicate that the Registration Request has been validated for integrity protection, but may not include the rest of the UE context.

In addition, the initial AMF may set the indication that the UE is validated according to step (9)(a) described below, in case the initial AMF has performed successful UE authentication after previous integrity check failure in the old AMF. The NF consumers may not need to subscribe for the events once again with the initial AMF after the UE is successfully registered with the initial AMF.

If the initial AMF has already received the UE context from the old AMF during handover procedure, then steps 4, 5, and 10 may be skipped. For an Emergency Registration, if the UE identifies itself with a 5G-GUTI that is not known to the AMF, steps 4 and 5 may be skipped and the AMF immediately requests the SUPI from the UE. If the UE identifies itself with PEI, the SUPI request shall be skipped. Allowing Emergency Registration without a user identity may be dependent on local regulations.

At step (5) of method 400, the old AMF may send to initial AMF: Response to Namf_Communication_UEContextTransfer (SUPI, UE Context in AMF (as per Table 5.2.2.2.2-1 of 3GPP TS 23.502)) or UDSF to initial AMF: Nudsf_Unstructured Data Management_Query( ). The old AMF may start an implementation specific (guard) timer for the UE context.

If the UDSF was queried in step (4), the UDSF responds to the initial AMF for the Nudsf_Unstructured Data Management_Query invocation with the related contexts including established PDU Sessions, the old AMF can include SMF information DNN, S-NSSAI(s) and PDU Session ID, active NGAP UE-TNLA bindings to N3IWF, and the old AMF can also include information about the NGAP UE-TNLA bindings. If the Old AMF was queried in step (4), the old AMF responds to the initial AMF for the Namf_Communication_UEContextTransfer invocation by including the UE's SUPI and the UE Context.

If the old AMF holds information about established PDU Session(s), the old AMF can include SMF information, DNN(s), S-NSSAI(s) and PDU Session ID(s). If the old AMF holds the UE context established via N3IWF, the old AMF can include the CM state for UE connected via N3IWF. If the UE is in CM-CONNECTED state via N3IWF, the old AMF includes information about the NGAP UE-TNLA bindings. If the old AMF fails the integrity check of the Registration Request NAS message, the old AMF shall indicate the integrity check failure.

If the old AMF holds information about AM Policy Association and the information about UE Policy Association (e.g., using the Policy Control Request Trigger for updating UE Policy as defined in 3GPP TS 23.503), the old AMF includes the information about the AM Policy Association, the UE Policy Association and PCF ID. In the roaming case, V-PCF ID and H-PCF ID are included. When the initial AMF uses UDSF for context retrieval, interactions among old AMF, the initial AMF and UDSF due to UE signaling on old AMF at the same time may become an implementation issue.

At step (6), the initial AMF may send to UE: Identity Request ( ). If the SUCI is not provided by the UE nor retrieved from the old AMF, the Identity Request procedure is initiated by AMF sending an Identity Request message to the UE requesting the SUCI.

At step (7), the UE may send to initial AMF: Identity Response ( ). The UE may respond with an Identity Response message including the SUCI. The UE may derive the SUCI by using the provisioned public key of the HPLMN (e.g., as specified in 3GPP TS 33.501).

At step (8), the initial AMF may decide to initiate UE authentication by invoking an AUSF. In that case, the AMF selects an AUSF based on SUPI or SUCI (e.g., as described in 3GPP TS 23.501, clause 6.3.4). If the initial AMF is configured to support Emergency Registration for unauthenticated SUPIs and the UE indicated Registration type Emergency Registration, the initial AMF may skip the authentication, or the initial AMF can accept that the authentication may fail and continues the Registration procedure.

At step (9)(a), if authentication is required, the initial AMF requests the authentication from the AUSF. When Tracing Requirements about the UE are available at the initial AMF, the initial AMF provides Tracing Requirements in its request to AUSF. Upon request from the initial AMF, the AUSF may execute authentication of the UE. The authentication may be performed (e.g., as described in 3GPP TS 33.501). The AUSF may select a UDM (e.g., as described in 3GPP TS 23.501, clause 6.3.8) and can obtain the authentication data from UDM.

Once the UE has been authenticated, the AUSF provides relevant security related information to the initial AMF. In case the initial AMF provided a SUCI to AUSF, the AUSF may return the SUPI to AMF only after the authentication is successful. After successful authentication in initial AMF, which can be triggered by the integrity check failure in the old AMF at step (5), the initial AMF invokes step (4) above again and indicates that the UE is validated (e.g., through the reason parameter as specified in clause 5.2.2.2.2 of 3GPP TS 23.502).

At step (9)(b), if NAS security context does not exist, the NAS security initiation may be performed (e.g., as described in 3GPP TS 33.501). If the UE had no NAS security context in step 1, the UE may include the full Registration Request message (e.g., as defined in 3GPP TS 24.501).

At step (9)(c), the initial AMF may initiate NGAP procedure to provide the 5G-AN with security context (e.g., as specified in 3GPP TS 38.413) if the 5G-AN had requested for UE Context. Also, if the AMF does not support N26 for EPS interworking and the AMF received UE MM Core Network Capability including an indication that it supports Request Type flag "handover" for PDN connectivity request during the attach procedure (e.g., as defined in clause 5.17.2.3.1 of 3GPP TS 23.501), the initial AMF may provide an indication "Redirection for EPS fallback for voice is possible" towards 5G-AN (e.g., as specified in 3GPP TS 38.413). In addition, if Tracing Requirements about the UE are available at the initial AMF, the initial AMF may provide the 5G-AN with Tracing Requirements in the NGAP procedure.

At step (9)(d), the 5G-AN may store the security context and can acknowledge to the initial AMF. The 5G-AN uses the security context to protect the messages exchanged with the UE (e.g., as described in 3GPP TS 33.501).

At step (10), the initial AMF may send to old AMF: Namf_Communication_RegistrationCompleteNotify ( ). If the AMF has changed the initial AMF, the initial AMF may notify the old AMF that the registration of the UE in the initial AMF is completed by invoking the Namf_Communication_RegistrationCompleteNotify service operation. If the authentication/security procedure fails, then the Registration may be rejected, and the initial AMF may invoke the Namf_Communication_RegistrationCompleteNotify service operation with a reject indication reason code towards the old AMF. The old AMF continues as if the UE context transfer service operation was never received.

If one or more of the S-NSSAIs used in the old Registration Area cannot be served in the target Registration Area, the initial AMF may determine which PDU Session cannot be supported in the new Registration Area. The initial AMF may invoke the Namf_Communication_RegistrationCompleteNotify service operation including the rejected PDU Session ID and a reject cause (e.g., the S-NSSAI becomes no longer available) towards the old AMF. Then, the new AMF modifies the PDU Session Status correspondingly. The old AMF may inform the corresponding SMF(s) to locally release the UE's SM context by invoking the Nsmf_PDUSession_ReleaseSMContext service operation (e.g., as defined in clause 5.2.2.2.3 of 3GPP TS 23.502).

If the initial AMF receives in the UE context transfer in step (3), the information about the AM Policy Association and the UE Policy Association, and decides, based on local policies, not to use the PCF(s) identified by the PCF ID(s) for the AM Policy Association and the UE Policy Association, then the initial AMF may inform the old AMF that the AM Policy Association and the UE Policy Association in the UE context is not used any longer, and then the PCF selection may be performed.

At step (11), the initial AMF sends the NAS Security Mode Command (SMC) to the UE. The UE may reply with a NAS Security Mode Complete message containing a complete Registration Request message (e.g., as specified in clause 6.4.6 of 3GPP TS 33.501).

At step (12), if the initial AMF uses UE's subscription information to decide whether to reroute the Registration Request, and the UE's slice selection subscription information was not provided by old AMF, the AMF may select a UDM (e.g., as described in 3GPP TS 23.501, clause 6.3.8).

At step (13), the initial AMF may initiate the Nudm_SDM_Get procedure with the UDM. The initial AMF may send to UDM: Nudm_SDM_Get (SUPI, Slice Selection Subscription data). The initial AMF can request UE's Slice Selection Subscription data from UDM by invoking the Nudm_SDM_Get (e.g., as defined on clause 5.2.3.3.1 of 3GPP TS 23.502) service operation. UDM may get this information from UDR by Nudr_DM_Query(SUPI, Subscribed S-NSSAIs). The UDM may send to the initial AMF: Response to Nudm_SDM_Get. The AMF may obtain the Slice Selection Subscription data including Subscribed S-NSSAIs. The UDM may provide an indication that the subscription data for network slicing is updated for the UE. The UDM may respond with slice selection data to the initial AMF.

At step (14), the initial AMF may initiate the Nnssf_NSSelection_Get procedure with the NSSF. The Initial AMF may send to an NSSF: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], and PLMN ID of the SUPI), among others.

If a slice selection is to be used (as defined in clause 5.15.5.2.1 of 3GPP TS 23.501), the initial AMF cannot serve all the S-NSSAI(s) from the Requested NSSAI permitted by the subscription information, the initial AMF invokes the Nnssf_NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, PLMN ID of the SUPI and the TAI of the UE.

At step (15), the NSSF may initiate the UEcontext_Get procedure with the initial AMF. The NSSF may, based on local policy and subscription information (e.g. Allowed NSSAI, TAI in step 14), decide that the AMF re-allocation via RAN procedure is to be carried out. The NSSF can generate or establish a Temporary Identity for UE Context (TIUC), sometimes referred to as a US context identifier. The NSSF may send a UE context request message to get the UE context from the initial AMF. The UE context request message may include the Temporary Identity for UE Context (TIUC) and a NSSF ID (e.g., identifier of the NSSF). If the initial AMF receives the UE context request from the NSSF, the initial AMF may send a UE context response message that includes UE context to the NSSF. The NSSF may store or maintain an association or mapping of the TIUC with the UE context, e.g., (TIUC, UE context). Subscription permanent identifier (SUPI) may be included or associated with the UE context. The NSSF can also/alternatively use SUPI to identify, access and/or retrieve the UE context.

At step (16), the NSSF may send or transmit to the Initial AMF: a Response to Nnssf_NSSelection_Get (including for instance: AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], [Mapping Of Configured NSSAI]).

The NSSF may perform the steps, for example, as specified in point (B) in clause 5.15.5.2.1 of 3GPP TS 23.501. The NSSF can return to the initial AMF the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF may return NSI ID(s) associated with the Network Slice instance(s) corresponding to certain S-NSSAI(s). The NSSF may return the NRF(s) to be used to select NFs/services within the selected Network Slice instance(s). The NSSF may return also information regarding rejection causes for S-NSSAI(s) not included in the Allowed NSSAI. The NSSF may return a Configured NSSAI for the Serving PLMN, and possibly the associated mapping of the Configured NSSAI.

At step (17), the initial AMF may initiate a Nnrf_NFDiscovery procedure with the NRF. The initial AMF may send to NRF: Nnrf_NFDiscovery_Request (NF type, AMF Set). If the initial AMF does not locally store the target AMF address, and if the initial AMF intends to use direct reroute to the target AMF, or a reroute via (NG-R)AN message is to include the AMF's address, then the initial AMF invokes the Nnrf_NFDiscovery_Request service operation from the NRF to find a proper target AMF which has the proper or required NF capabilities to serve the UE. The NF type may be set to AMF. The AMF Set can be included in the Nnrf_NFDiscovery_Request.

The NRF may send to AMF (e.g., (initial AMF): Response to Nnrf_NFDiscovery_Request (list of (AMF pointer, AMF's address, plus additional selection rules and NF capabilities)). The NRF may reply with the list of potential target AMF(s). The NRF may also provide the details of the services offered by the candidate AMF(s) along with the notification end-point for each type of notification service that the selected AMF had registered with the NRF, if available. As an alternative, the NRF may provide a list of potential target AMFs and their capabilities, and optionally, additional selection rules. Based on the information about registered NFs and required capabilities, a target AMF may be selected by the initial AMF.

If the initial AMF is not part of the target AMF set, and is not able to get a list of candidate AMF(s) by querying the NRF with the target AMF set (e.g., the NRF locally pre-configured on AMF does not provide the requested information, the query to the appropriate NRF provided by the NSSF is not successful, or the initial AMF has knowledge that the initial AMF is not authorized as serving AMF etc.) then the initial AMF may forward the NAS message to the target AMF via (R)AN executing. The Allowed NSSAI and the AMF Set may be included to enable the (R)AN to select the target AMF (e.g., as described in 3GPP TS 23.501 clause 6.3.5).

At step (18), if the initial AMF, based on or responsive to local policy and subscription information, can decide or determine to forward the NAS message to the target AMF via (R)AN unless the target AMF(s) are returned from the NSSF and identified by a list of candidate AMF(s). The initial AMF may send for instance a Reroute NAS message to the (R)AN. The Reroute NAS message may include the information about the target AMF, the full Registration Request message and the information about the NSSF ID. If the initial AMF has obtained the information as described at step 16, that information can be included. The Reroute NAS message may also include the TIUC and/or SUPI.

At step (19), the (R)AN can send or transmit the Initial UE message to the target AMF indicating a reroute due to slicing, including the information from step (16) that the NSSF provided, and the information about the NSSF ID. If the RAN receives the TIUC in step (18), the Initial UE message can include the TIUC. If the RAN receives the SUPI in step (18), the Initial UE message can include the SUPI.

At step (20), the target AMF may initiate a UEcontext_Get procedure with the NSSF. If the target AMF receives TIUC from the Initial UE message, the target AMF may send a UE context request message that includes the TIUC to obtain, get or request the UE context from the NSSF. If the target AMF receives SUPI from the Initial UE message, the target AMF may send a UE context request message that includes the SUPI to request, get or obtain UE context from the NSSF. If the NSSF receives the UE context request message including the TIUC or SUPI, from the target AMF, the NSSF may send a UE context response message that includes the UE context to the target AMF.

At step (21)(a), if authentication is to be carried out, the target AMF may request the authentication from the AUSF. If Tracing Requirements about the UE are available at the target AMF, the target AMF may provide the Tracing Requirements in its request to AUSF. Upon request from the target AMF, the AUSF may execute authentication of the UE. The authentication may be performed, for example, as described in 3GPP TS 33.501. The AUSF may select a UDM as described in 3GPP TS 23.501, clause 6.3.8 and can get the authentication data from UDM.

Once the UE has been authenticated, the AUSF provides relevant security related information to the target AMF. After successful authentication in target AMF, which is triggered by the integrity check failure in the initial AMF at step (21)(a), the target AMF invokes step (20) above again and indicates that the UE is validated (e.g., through the reason parameter as specified in clause 5.2.2.2.2 of 3GPP TS 23.502).

At step (21)(b), the target AMF may initiate NGAP procedure to provide the 5G-AN with security context (e.g., as specified in 3GPP TS 38.413) if the 5G-AN had requested for UE Context. Also, if the target AMF does not support N26 for EPS interworking and it receives the UE MM Core Network Capability including an indication that it supports Request Type flag "handover" for PDN connectivity request during the attach procedure (e.g., as defined in clause 5.17.2.3.1 of 3GPP TS 23.501), the target AMF can provide an indication "Redirection for EPS fallback for voice is possible" towards 5G-AN (e.g., as specified in 3GPP TS 38.413). In addition, if the Tracing Requirements about the UE are available at the target AMF, the target AMF provides the 5G-AN with Tracing Requirements in the NGAP procedure.

At step (21)(c), the 5G-AN may store the security context and can acknowledge to the target AMF. The 5G-AN may use the security context to protect the messages exchanged with the UE (e.g., as described in 3GPP TS 33.501).

At step (22), the Target AMF may send the NAS Security Mode Command (SMC) to the UE. The UE may reply with a NAS Security Mode Complete message containing a complete Registration Request message (e.g., specified in clause 6.4.6 of 3GPP TS 33.501).

After receiving the Registration Request message transmitted, if the UE context is received from the initial AMF, the target AMF may continue with the Registration procedure (e.g., as described in from step (11) until step (22) of figure 4.2.2.2.2-1 of 3GPP TS 23.502).

Figure 5:
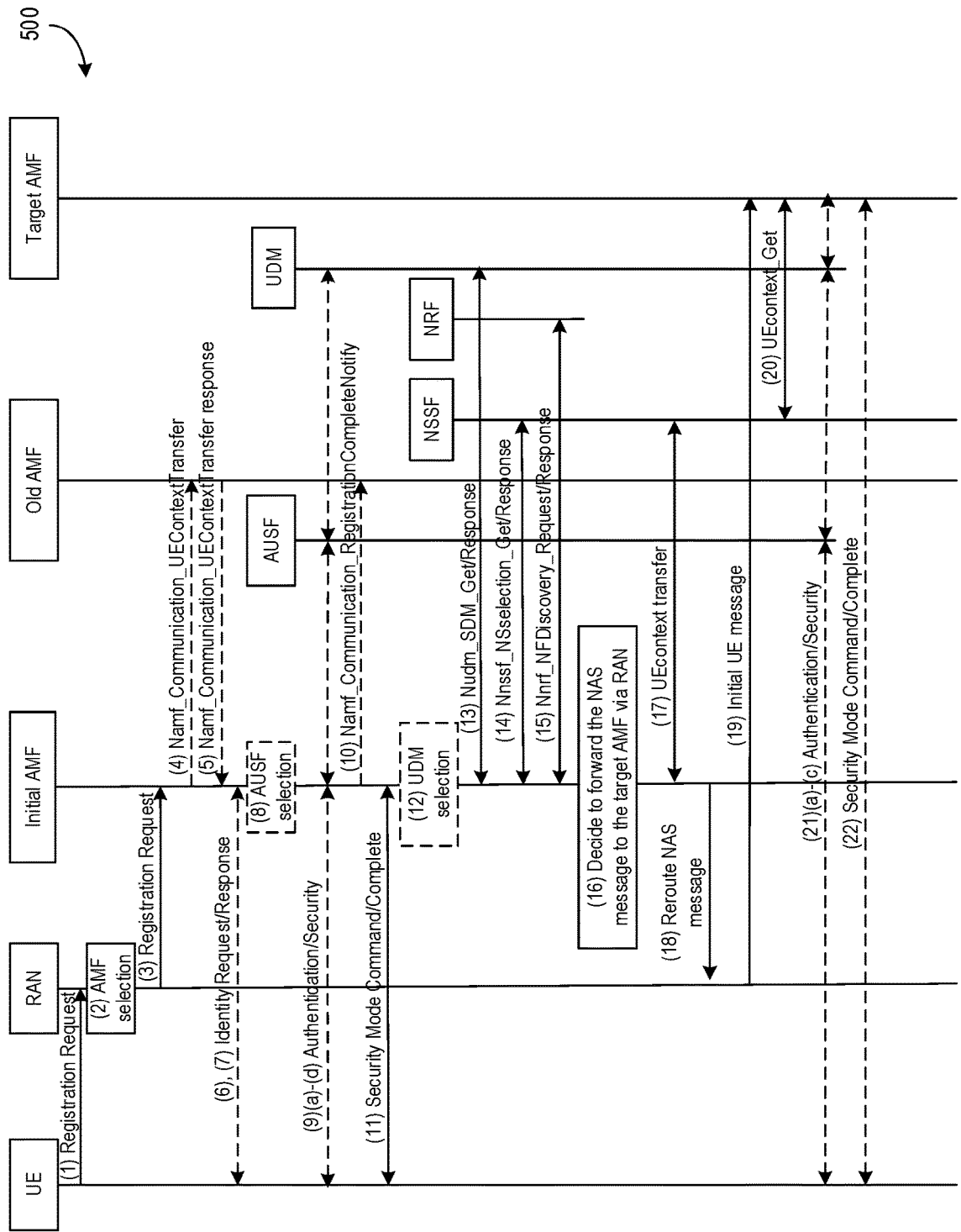
FIG. 5 illustrates a dataflow diagram of an example method of registering with accessibility and mobility management (AMF) function re-allocation initiated by an initial AMF.

Case 2: Initial AMF May Determine to Initiate AMF Re-Allocation Procedure and Send the US Context to NSSF Referring now to FIG. 5, depicted is a dataflow diagram of a method 500 of registering with accessibility and mobility management function (AMF) re-allocation initiated by an initial AMF. The method 500 may involve the initial AMF deciding on an initial AMF re-allocation procedure and sending the UE context to NSSF. The steps of method 400 may be identical or similar to the steps of method 500. Steps (1)-(13) and (21)(a)-(22) of method 400 may be identical to steps (1)-(13) and (21)(a)-(22) of method 500, respectively.

At step (14), the initial AMF may initiate a Nnssf_NS-Selection_Get procedure with the NSSF. The Initial AMF may send or transmit to the NSSF: Nnssf_NSSelection_Get (Requested NSSAI, [Mapping Of Requested NSSAI], Subscribed S-NSSAI(s) with the default S-NSSAI indication, TAI, Allowed NSSAI for the other access type (if any), [Mapping of Allowed NSSAI], PLMN ID of the SUPI).

If a slice selection is to be performed, (e.g., as defined in clause 5.15.5.2.1 of 3GPP TS 23.501) (for example, the initial AMF cannot serve all the S-NSSAI(s) from the Requested NSSAI permitted by the subscription information), the initial AMF may invoke the Nnssf_NSSelection_Get service operation from the NSSF by including Requested NSSAI, optionally Mapping Of Requested NSSAI, Subscribed S-NSSAIs with the default S-NSSAI indication, Allowed NSSAI for the other access type (if any), Mapping of Allowed NSSAI, and PLMN ID of the SUPI and the TAI of the UE.

The NSSF may send, provide or transmit to the Initial AMF: a Response to Nnssf_NSSelection_Get (including, for instance: AMF Set or list of AMF addresses, Allowed NSSAI for the first access type, [Mapping Of Allowed NSSAI], [Allowed NSSAI for the second access type], [Mapping of Allowed NSSAI], [NSI ID(s)], [NRF(s)], [List of rejected (S-NSSAI(s), cause value(s))], [Configured NSSAI for the Serving PLMN], and [Mapping Of Configured NSSAI]).

The NSSF may perform the steps, for example, as specified in point (B) in clause 5.15.5.2.1 of 3GPP TS 23.501. The NSSF can return to the initial AMF the Allowed NSSAI for the first access type, optionally the Mapping Of Allowed NSSAI, the Allowed NSSAI for the second access type (if any), optionally the Mapping of Allowed NSSAI and the target AMF Set or, based on configuration, the list of candidate AMF(s). The NSSF may return NSI ID(s) associated to the Network Slice instance(s) corresponding to certain S-NSSAI(s). The NSSF may return the NRF(s) to be used to select NFs/services within the selected Network Slice instance(s). The NSSF may also return information regarding rejection causes for S-NSSAI(s) not included in the Allowed NSSAI. The NSSF may return Configured NSSAI for the Serving PLMN, and possibly the associated mapping of the Configured NSSAI.

At step (15), the initial AMF may initiate a Nnrf_NFDiscovery procedure with the NRF: Nnrf_NFDiscovery_Request (including for instance: NF type, AMF Set). If the initial AMF does not locally store or maintain the target AMF address, and if the initial AMF intends to use direct reroute to the target AMF, or the reroute via (NG-R)AN message is to include an AMF address, then the initial AMF may invoke a Nnrf_NFDiscovery_Request service operation from the NRF to find, select or identify a proper target AMF which has proper or required NF capabilities to serve the UE. The NF type may be set to AMF. The AMF Set can be included in the Nnrf_NFDiscovery_Request.

The NRF may send or transmit to AMF: a Response to Nnrf_NFDiscovery_Request (which may include for instance: in a list or otherwise (AMF pointer, AMF address, plus additional selection rules and NF capabilities)). The NRF may reply with the list of potential target AMF(s). The NRF may also provide the details of the services offered by the candidate AMF(s) along with the notification end-point for each type of notification service that the selected AMF had registered with the NRF, if available. As an alternative, the NRF may provide a list of potential target AMFs and their capabilities, and optionally, additional selection rules. Based on the information about registered NFs and required capabilities, a target AMF may be selected by the initial AMF.

If the initial AMF is not part of the target AMF set, and is not able to get a list of candidate AMF(s) by querying the NRF with the target AMF set (e.g., the NRF locally pre-configured on AMF does not provide the requested information, the query to the appropriate NRF provided by the NSSF is not successful, or the initial AMF has knowledge that the initial AMF is not authorized as serving AMF, etc.), then the initial AMF may forward the NAS message to the target AMF via (R)AN executing. The Allowed NSSAI and the AMF Set are included to enable the (R)AN to select the target AMF (e.g., as described in 3GPP TS 23.501 clause 6.3.5).

At step (16), the initial AMF may decide or determine to forward the NAS message to the target AMF via the RAN. The initial AMF, based on local policy and/or subscription information, may decide or determine to forward the NAS message to the target AMF via (R)AN unless the target AMF(s) are returned from the NSSF and identified by a list of candidate AMF(s).

At step (17), the initial AMF may initiate a UE context transfer procedure with the NSSF. The initial AMF may generate and/or send a UE context transfer message include the UE context to the NSSF. The NSSF can generate a Temporary Identity for UE Context (TIUC) and may store or maintain an association or mapping between the TIUC and the UE context, e.g., (TIUC, UE context). SUPI may be included in and/or associated with the UE context. The NSSF can also/alternatively use SUPI to identify, access and/or retrieve the UE context. The NSSF can generate and/or send a UE context transfer response message that includes the NSSF ID and the TIUC to the initial AMF.

At step (18), the initial AMF, based on local policy and/or subscription information, may decide or determine to forward the NAS message to the target AMF via (R)AN unless the target AMF(s) are returned from the NSSF and identified by a list of candidate AMF(s). The initial AMF may for instance send a Reroute NAS message to the (R)AN. The Reroute NAS message may include the information about the target AMF, the full Registration Request message and the information about the NSSF ID. If the initial AMF has obtained the information as described at step (14) (e.g., Response to Nnssf_NSSelection_Get), that information may be included. The Reroute NAS message may include the TIUC and/or SUPI.

At step (19), the (R)AN may generate and/or send the Initial UE message including the information about the NSSF ID, to the target AMF, indicating reroute due to slicing, and may include the information from step (14) that the NSSF provided. If the RAN receives the TIUC in step (18), the Initial UE message may include the TIUC. If the RAN receives the SUPI in step (18), the Initial UE message may include the SUPI.

At step (20), the target AMF may initiate a UEcontext_Get procedure with the NSSF. If the target AMF receives the TIUC from the Initial UE message, the target AMF can send a UE context request message including the TIUC to get, obtain and/or request the UE context from the NSSF. If the target AMF receives the SUPI from the Initial UE message, or the target AMF has the SUPI of the UE, the target AMF may send a UE context request message including the SUPI to get, obtain, access and/or request the UE context from the NSSF. If the NSSF receives the UE context request message including the TIUC and/or SUPI, from the target AMF, the NSSF may send a UE context response message that includes the UE context to the target AMF. The remaining steps (21)(a)-(22) of the method 500 may be similar or identical to steps 21(a)-(22) of the method 400.

Figure 6:
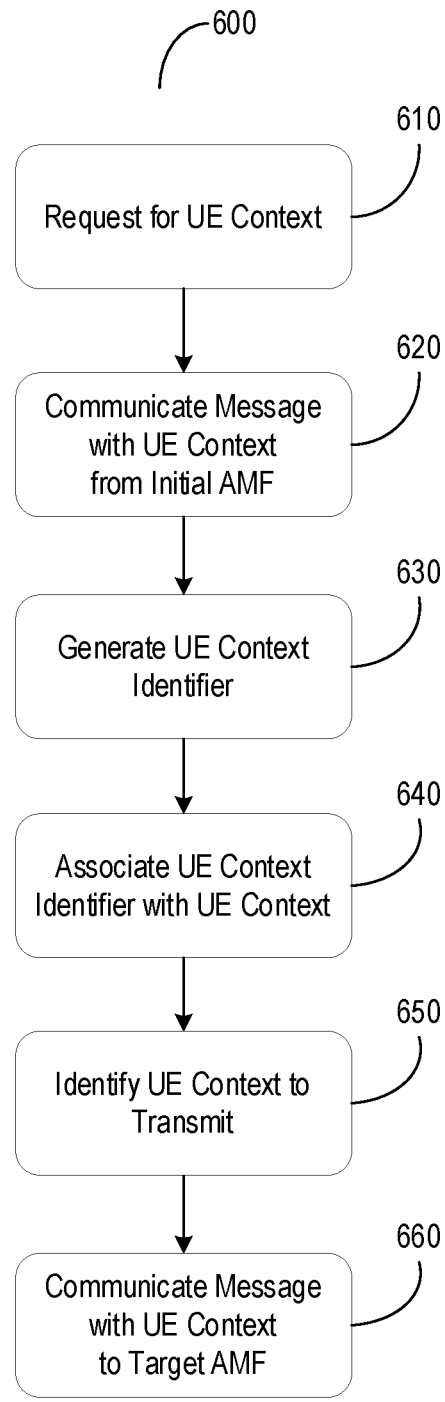
FIG. 6 illustrates a flow diagram of an example method of registering with accessibility and mobility management (AMF) function re-allocation based on network slice selection function (NSSF), in accordance with an embodiment of the present disclosure.

Referring now to FIG. 6, a flow diagram of an method 600 of registering with accessibility and mobility management function (AMF) re-allocation based on a network slice selection function (NSSF). The method 600 may be performed or implemented using any of the components described herein, such as those detailed in conjunction with FIGS. 1-5. In brief overview, the method 600 may include requesting for UE context (610). The method 600 may include communicating a message with the UE context from an initial AMF (620). The method 600 may include generating an UE context identifier (630). The method 600 may include associating the UE context identifier with the UE context (640). The method 600 may include identifying UE context to transmit (650). The method 600 may include communicating a message with UE context to a target AMF (660).

In further detail, the method 600 may include requesting for UE context (610). The UE context may include parameters (e.g., security information) for setting up at the NG-RAN. In some embodiments, a network slice source function (NSSF) may perform, commence, or otherwise initiate a procedure to request an initial access and mobility management function (AMF) for the UE context. The procedure may include, for example, the UE context get procedure as laid out in step (15) of method 500. In some embodiments, the NSSF may send a UE context request message (e.g., as in step (15) of method 500). The UE context request message may include a UE context identifier and an identifier of the NSSF. The UE context identifier may include, for example, a temporary identity for UE context (TIUC). The identifier for the NSSF may uniquely reference the NSSF (from a plurality of NSSFs or network entities).

The method 600 may include communicating a message with the UE context from an initial AMF (620). The initial access and mobility management function (AMF) may transmit a message to the network slice source function (NSSF). The message may include user equipment (UE) context (e.g., the UE context response message in step (15) of method 400 or step (17) of method 500). The transmission of the message by the initial AMF may be in response to receipt of the request (e.g., the UE context request message) from the NSSF. The NSSF may in turn receive the message from the initial AMF. In some embodiments, the NSSF may receive the message via a procedure initiated by the initial AMF. The procedure may include, for example, the UE context transfer procedure (e.g., step (17) of method 500).

The method 600 may include generating an UE context identifier (630). The NSSF may identify, create, or otherwise generate the UE context identifier. The UE context identifier may include, for example, a Temporary Identity for UE Context (TIUC). The generation of the UE context identifier by the NSSF may be responsive to the receipt of the UE context from the initial AMF. In some embodiments, the generation of the UE context identifier by the NSSF may be responsive to the receipt of the UE context request message from the initial AMF.

The method 600 may include associating the UE context identifier with the UE context (640). The NSSF may link, map, store or otherwise associate the UE context identifier with the UE context. The association of the UE context identifier (e.g., TIUC) with the UE context may be responsive to the generation of the UE context identifier. In some embodiments, the NSSF may store the association of the UE context identifier with the UE context (e.g., TIUC and UE context).

The method 600 may include identifying the UE context to transmit (650). The NSSF may obtain, retrieve, or otherwise identify UE context (e.g., from a plurality of candidate/available US contexts) to transmit to a target AMF. In some embodiments, the initial AMF may transmit a non-access stratum (NAS) message to a radio access network (RAN). The NAS message may include the identifier of the NSSF. In addition, the NAS message may include the UE context identifier and/or a Subscription Permanent Identifier (SUPI), among others. The RAN may include, for example, a next generation radio access network (NG-RAN). The NAS message may be generated, formatted, and communicated, for example, as described in step (18) of method 400 or step (18) of method 500. The SUPI may be a globally unique identifier persistently and uniquely allocated to the subscriber corresponding to the UE (and may be uniquely associated with the UE context corresponding to the UE). The RAN may receive the NAS message from the initial AMF.

In some embodiments, the RAN may send, provide, or transmit an initial UE message to the target AMF. The initial UE message may include the identifier of the NSSF. In addition, the initial UE message may include the UE context identifier and/or the SUPI. The initial UE message may be generated, formatted, and communicated, for example, as described in step (18) of method 400 or step (18) of method 500. The target AMF may in turn receive the initial UE message. Upon receipt of the initial UE message, the target AMF may send a request message that includes the UE context identifier and/or SUPI to the NSSF. The request message may be generated, formatted, and communicated, for example, as detailed in step (20) of method 500.

The request message may be directed from the target AMF to the NSSF according to the identifier of the NSSF. The target AMF may use the identifier of the NSSF to identify the NSSF (from a plurality of NSSFs or network entities) to which to send the request message. The NSSF in turn may identify or receive the request message that includes the UE context identifier or the SUPI from the target AMF. With receipt, the NSSF may determine, retrieve, and/or identify the UE context, to send, provide, and/or transmit to the target AMF according to the UE context identifier and/or the SUPI included in the request message. In some embodiments, the request message may include information to identify the target AMF to send the UE context.

The method 600 may include communicating a message including the UE context to a target AMF (660). The NSSF may transmit, provide, or otherwise send the message including the UE context to the target AMF. The message may include, for example, the UE context response message (e.g., step (20) of method 400) or the UE context transfer message (e.g., step (20) of method 400). The target AMF may in turn receive the message including the UE context from the NSSF. In some embodiments, the NSSF may provide, send, or otherwise transmit the message including the UE context to the target AMF in response to receipt of the request message from the target AMF. The target AMF may in turn receive the message including the UE context, and may initiate authentication and security procedures with the UE.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according to embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:
   receiving, by a network slice selection function (NSSF), a first message comprising a user equipment (UE) context from an initial access and mobility management function (AMF);
   generating, by the NSSF, a UE context identifier;
   associating, by the NSSF, the UE context identifier with the UE context; and
   transmitting, by the NSSF to a target AMF, a second message comprising the UE context.

2. The method of claim 1, comprising initiating, by the NSSF, a procedure to request the initial AMF for the UE context.

3. The method of claim 1, comprising:
   sending, by the NSSF to the initial AMF, a UE context request message that includes the UE context identifier and an identifier of the NSSF; and
   receiving, by the NSSF in response to the UE context request message, the first message comprising the UE context from the initial AMF.

4. The method of claim 1, wherein a non-access stratum (NAS) message, from the initial AMF to a radio access network (RAN), includes the identifier of the NSSF, and the UE context identifier or a subscription permanent identifier (SUPI).

5. The method of claim 4, wherein an initial UE message, from the RAN to the target AMF, includes the identifier of the NSSF, and the UE context identifier or the SUPI.

6. The method of claim 5, comprising:
   receiving, by the NSSF from the target AMF, a request message that includes the UE context identifier or the SUPI, the request message directed to the NSSF according to the identifier of the NSSF.

7. The method of claim 6, comprising:
   identifying, by the NSSF according to the UE context identifier or the SUPI, the UE context to transmit to the target AMF; and
   transmitting, by the NSSF to the target AMF in response to the request message, the second message comprising the UE context.

8. The method of claim 1, wherein the NSSF receives the first message via a procedure initiated by the initial AMF.

9. The method of claim 1, comprising:
sending, by the NSSF to the initial AMF, a response message that includes the UE context identifier and an identifier of the NSSF.

10. The method of claim 9, wherein a non-access stratum (NAS) message, from the initial AMF to a radio access network (RAN), includes the identifier of the NSSF, and the UE context identifier or a subscription permanent identifier (SUPI).

11. The method of claim 10, wherein an initial UE message, from the RAN to the target AMF, includes the identifier of the NSSF, and the UE context identifier or the SUPI.

12. The method of claim 11, comprising:
receiving, by the NSSF from the target AMF, a request message that includes the UE context identifier or the SUPI, the request message directed to the NSSF according to the identifier of the NSSF.

13. The method of claim 12, comprising:
identifying, by the NSSF according to the UE context identifier or the SUPI, the UE context to transmit to the target AMF; and
transmitting, by the NSSF to the target AMF in response to the request message, the second message comprising the UE context.

14. A method, comprising:
transmitting, by an initial access and mobility management function (AMF) to a network slice selection function (NSSF), a first message comprising a user equipment (UE) context; and
causing the NSSF to transmit a second message comprising the UE context to a target AMF, wherein the UE context is associated with a UE context identifier generated by the NSSF.

15. The method of claim 14, comprising causing the NSSF to initiate a procedure to request the initial AMF for the UE context.

16. The method of claim 14, comprising:
receiving, by the initial AMF from the NSSF, a UE context request message that includes the UE context identifier and an identifier of the NSSF; and
sending, by the initial AMF to the NSSF in response to the UE context request message, the first message comprising the UE context.

17. The method of claim 14, comprising:
transmitting, by the initial AMF, a non-access stratum (NAS) message to a radio access network (RAN), the NAS message including the identifier of the NSSF, and the UE context identifier or a subscription permanent identifier (SUPI).

18. The method of claim 17, wherein an initial UE message, from the RAN to the target AMF, includes the identifier of the NSSF, and the UE context identifier or the SUPI.

19. A network slice selection function (NSSF), comprising:
at least one processor configured to:
receive, via a transceiver, a first message comprising a user equipment (UE) context from an initial access and mobility management function (AMF);
generate a UE context identifier;
associate the UE context identifier with the UE context; and
transmit, via the transceiver to a target AMF, a second message comprising the UE context.

20. An initial access and mobility management function (AMF), comprising:
at least one processor configured to:
transmit, via a transmitter to a network slice selection function (NSSF), a first message comprising a user equipment (UE) context; and
cause the NSSF to transmit a second message comprising the UE context to a target AMF, wherein the UE context is associated with a UE context identifier generated by the NSSF.

* * * * *